United States Patent
Gedge et al.

(10) Patent No.: US 10,447,462 B2
(45) Date of Patent: Oct. 15, 2019

(54) OPTIMISED LINE SYNCHRONISATION

(71) Applicant: BRITISH TELECOMMUNICATIONS PUBLIC LIMITED COMPANY, London (GB)

(72) Inventors: Richard Gedge, London (GB); Chi-Fai Lau, London (GB); Simeon P Williamson, London (GB)

(73) Assignee: BRITISH TELECOMUNICATIONS public limited company, London (GB)

( * ) Notice: Subject to any disclaimer, the term of this patent is extended or adjusted under 35 U.S.C. 154(b) by 170 days.

(21) Appl. No.: 15/114,942

(22) PCT Filed: Jan. 28, 2015

(86) PCT No.: PCT/GB2015/050192
§ 371 (c)(1),
(2) Date: Jul. 28, 2016

(87) PCT Pub. No.: WO2015/114326
PCT Pub. Date: Aug. 6, 2015

(65) Prior Publication Data
US 2016/0352499 A1    Dec. 1, 2016

(30) Foreign Application Priority Data

Jan. 29, 2014   (EP) .................................... 14250016

(51) Int. Cl.
*H04J 3/06*   (2006.01)
*H04L 7/00*   (2006.01)
(Continued)

(52) U.S. Cl.
CPC ......... *H04L 7/0016* (2013.01); *H04B 17/336* (2015.01); *H04L 1/0002* (2013.01);
(Continued)

(58) Field of Classification Search
CPC ...... H04J 3/0638; H04J 3/0685; H04J 3/0632; H04W 56/00; H04W 56/001
See application file for complete search history.

(56) References Cited

U.S. PATENT DOCUMENTS

| 2003/0076878 A1* | 4/2003 | Jones ...................... H04M 1/24 |
| | | 375/219 |
| 2003/0123560 A1* | 7/2003 | Jacobsen ............... H04L 5/0046 |
| | | 375/260 |

(Continued)

FOREIGN PATENT DOCUMENTS

| EP | 2 237 462 | 10/2010 | |
| EP | 2237462 A1 * | 10/2010 | ........... H04L 1/0001 |
| WO | WO 2011/107155 | 9/2011 | |

OTHER PUBLICATIONS

International Search Report issued in Appln No. PCT/GB2015/050192 dated Apr. 2, 2015 (3 pages).

(Continued)

*Primary Examiner* — Siren Wei
(74) *Attorney, Agent, or Firm* — Nixon & Vanderhye P.C.

(57) ABSTRACT

This invention relates to a method of determining an optimum point at which to synchronize a digital subscriber line in a telecommunications network, with the aim of maximizing the resulting synchronization rate while maintaining a stable line. For many lines, the signal to noise ratio (SNR) varies over the course of a day, and recurs on a daily basis. The phenomenon is often referred to as the "diurnal effect". The SNR history for the line is monitored, and the minimum SNR for the line is determined over a 24 hour period to take into account the diurnal effect. The current target SNR margin imposed by DLM on the line is determined, for example, by interrogating the DLM system or by noting the SNR margin on the line immediately after the most recent line synchronization. The optimum point at which a resyn- (Continued)

chronization is to be performed is calculated as point when the SNR on the line is equal to the minimum SNR plus the current target SNR margin. Synchronizing when the SNR is at this point should maximize the synchronization rate, while still maintaining a stable line.

14 Claims, 3 Drawing Sheets

(51) Int. Cl.
    *H04L 1/00*     (2006.01)
    *H04M 11/06*     (2006.01)
    *H04B 17/336*     (2015.01)
    *H04M 3/00*     (2006.01)
    *H04B 3/32*     (2006.01)

(52) U.S. Cl.
    CPC ......... *H04M 3/007* (2013.01); *H04M 11/062* (2013.01); *H04B 3/32* (2013.01)

(56) References Cited

U.S. PATENT DOCUMENTS

| | | | | |
|---|---|---|---|---|
| 2005/0237940 | A1* | 10/2005 | Tennyson | ................ H04L 12/42 370/235 |
| 2013/0114625 | A1* | 5/2013 | Cunningham | ...... H04L 41/5009 370/469 |
| 2014/0023189 | A1* | 1/2014 | Lins de Medeiros | ... H04B 3/32 379/406.01 |

OTHER PUBLICATIONS

Written Opinion of the International Searching Authority issued in Appln No. PCT/GB2015/050192 dated Apr. 2, 2015 (6 pages).

* cited by examiner

US 10,447,462 B2

OPTIMISED LINE SYNCHRONISATION

This application is the U.S. national phase of International Application No. PCT/GB2015/050192 filed Jan. 28, 2015 which designated the U.S. and claims priority to European Application No. 14250016.4 filed Jan. 29, 2014, the entire contents of each of which are hereby incorporated by reference.

FIELD OF THE INVENTION

This invention relates to a method of determining an optimum point at which to synchronise a digital subscriber line in a telecommunications network that balances synchronisation rate and stability.

BACKGROUND TO THE INVENTION

Digital subscriber line (DSL) technology, often referred to as "broadband", is a family of services that provides high speed digital data transmission over the metallic twisted copper pairs that form part of a local telephone network. DSL is commonly used to provide a customer's home with a network connection, typically to the Internet via an Internet Service Provider (ISP).

Some DSL lines, especially longer rural lines, are susceptible to interference resulting in instability in the connection. A DSL line can lose synchronisation when the amount of noise on the line is such that the data (signal) being transmitted cannot be processed correctly. Line management techniques can help address this problem and stabilise a line at the expense of a lower synchronisation rate. One such technique is known as Dynamic Line Management DLM.

DLM measures the line parameters, such as the error rates and train/resynchronisation events, and adjusts line configuration parameters accordingly to try and stabilise the line, which has the effect of reducing the synchronisation rate. DLM applies one of a limited number of profiles to the line to improve the stability. One method of achieving this is by setting a target signal to noise ratio margin, or target margin, which affects the maximum rate the line can synchronise at. A high target margin will result in a more stable line, and a low target margin a less stable line (all other factors being equal). The effect is more pronounced on problematic or longer lines.

In some typical forms of DLM, the profiles applied are limited in the sense that only a small number of relatively coarse target margins are used. An example of the range of target margins typically used might be 3 dB, 6 dB, 9 dB, 12 dB and 15 dB. The profile applied by DLM is used when a line resynchronises. Line resynchronisations can occur when the line can no longer maintain synchronisation, for example as result of excessive noise, interference, or a fault on the line.

The signal to noise ratio (SNR) of the line affects the synchronisation rate, as the bit allocation methods used when a line resynchronises are dependent on the SNR (of each frequency bin) when the line starts up.

SUMMARY OF THE INVENTION

According to one aspect of the present invention, there is provided a method of managing a digital subscriber line in a telecommunications network, comprising:
  determining a minimum signal to noise ratio of the digital subscriber line over a predetermined period of time from a plurality of signal to noise ratio values associated with the digital subscriber line;
  determining a target signal to noise ratio margin for the digital subscriber line;
  calculating an optimum signal to noise ratio as the sum of the minimum signal to noise ratio plus the target signal to noise ratio margin;
  synchronising the digital subscriber line in dependence on the optimum signal to noise ratio.

The predetermined periods of time may be a 24 period. The target signal to noise ratio margin can be obtained directly from the from a dynamic line management system. Alternatively, the target signal to noise ratio margin can be determined empirically by analysis of the signal to noise ratio margin of the digital subscriber line over a period of time, and identifying the target signal to noise ratio margin as the signal to noise ratio margin of the digital subscriber line immediately after a successful resynchronisation.

Preferably, the plurality of signal to noise ratio values are signal to noise ratio values averaged over a number of predetermined time periods, for example a number of 24 hour periods, with each of the signal to noise ratio values associated with a given time of day. The number of signal to noise ratio values will depend on how often measurements are taken over the period of time. Furthermore, the plurality of signal to noise ratio values can be calculated as the average of each of the signal to noise ratio values associated with each frequency bin of the digital subscriber line. The average of each of the signal to noise ratio values associated with each frequency bin of the digital subscriber line can be calculated as the geometric mean of the signal to noise ratio values associated with each frequency bin.

In the method, the sum may further include a predetermined signal to noise ratio tolerance.

According to a second aspect of the present invention, there is provided a line optimisation unit for managing a digital subscriber line in a telecommunications network adapted to:
  determine the minimum signal to noise ratio of the digital subscriber line over a predetermined period of time from a plurality of signal to noise ratio values associated with the digital subscriber line;
  determine the target signal to noise ratio margin for the digital subscriber line;
  calculate an optimum signal to noise ratio as the sum of the minimum signal to noise ratio plus the target signal to noise ratio margin;
  synchronise the digital subscriber line in dependence on the optimum signal to noise ratio.

According to a third aspect of the present invention, there is provided a customer premises equipment comprising a line optimisation unit for managing a digital subscriber line in a telecommunications network, said line optimisation unit adapted to:
  determine the minimum signal to noise ratio of the digital subscriber line over a predetermined period of time from a plurality of signal to noise ratio values associated with the digital subscriber line;
  determine the target signal to noise ratio margin for the digital subscriber line;
  calculate an optimum signal to noise ratio as the sum of the minimum signal to noise ratio plus the target signal to noise ratio margin;
  synchronise the digital subscriber line in dependence on the optimum signal to noise ratio.

According to a fourth aspect of the present invention, there is provided an aggregation transceiver device for aggregating a plurality of digital subscriber lines, comprising a line optimisation unit for managing the digital subscriber lines and adapted to:

determine the minimum signal to noise ratio of a digital subscriber line over a predetermined period of time from a plurality of signal to noise ratio values associated with the digital subscriber line;

determine the target signal to noise ratio margin for the digital subscriber line;

calculate an optimum signal to noise ratio as the sum of the minimum signal to noise ratio plus the target signal to noise ratio margin;

synchronise the digital subscriber line in dependence on the optimum signal to noise ratio.

The invention monitors the daily variation in the signal to noise ratio on a line as a result of interference, often referred to as the "diurnal effect", to determine an optimum value of the signal to noise ratio at which to perform a line synchronisation. By carefully calculating this signal to noise ratio value using the target signal to noise ratio margin, the synchronisation rate of the line can be maximised, whilst avoiding loss of synchronisation caused when the signal to noise ratio drops by an amount greater than the target signal to noise ratio margin from the signal to noise ratio at the time of resynchronisation.

The method can be used in conjunction with an existing DLM arrangement active on the line. By applying the method in a customer premises equipment, such as a home hub or router, the user can be given more control over the operation of their digital subscriber line that would not be possible through DLM alone, which the user has no control of.

DLM is generally quick at lowering the profile on a line, and thereby reducing the synchronisation rate, but slow at increasing the profile and resulting rate. The present invention can be used in conjunction with DLM to more quickly increase the rate on a line, and in particular if there are any increases in profile on a line.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

This invention relates to a method of determining an optimum point at which to synchronise a digital subscriber line in a telecommunications network, with the aim of maximising the resulting synchronisation rate whilst maintaining a stable line. For many lines, the signal to noise ratio (SNR) varies over the course of a day, and recurs on a daily basis. The phenomenon is often referred to as the "diurnal effect". The SNR history for the line is monitored, and the minimum SNR for the line is determined over a 24 hour period to take into account the diurnal effect. The current target SNR margin imposed by DLM on the line is determined, for example, by interrogating the DLM system or by noting the SNR margin on the line immediately after the most recent line synchronisation. The optimum point at which a resynchronisation is to be performed is calculated as point when the SNR on the line is equal to the minimum SNR plus the current target SNR margin. Synchronising when the SNR is at this point should maximise the synchronisation rate, whilst still maintaining a stable line.

Figure 1:
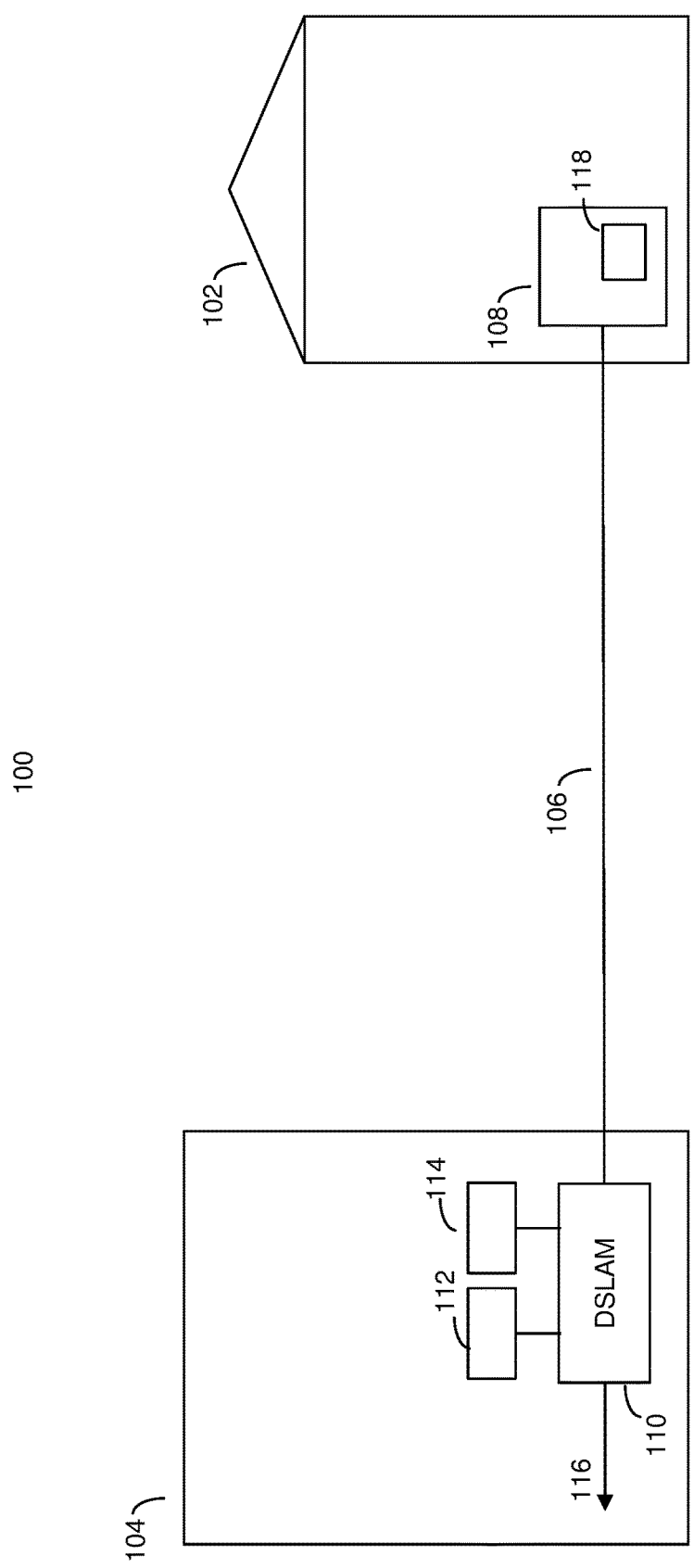
FIG. 1 is a system diagram showing a telephone exchange and a DSL line running to a customer premises.

FIG. 1 illustrates a telecommunications network 100 including a customer's premises 102. The customer's premises 102 is connected to a telephone exchange 104 via a telephone line 106. The telephone line 106 is a twisted copper or aluminium pair of wires. Within the customer premises 102, there is a customer premises equipment CPE 108, such as a modem or home hub, to which the line 106 is connected. At the exchange 104, the line 106 is connected to a digital subscriber line access multiplexer, DSLAM, 110.

The DSLAM 110 is a network element that provides digital subscriber line (DSL) services to connected lines and associated customer premises. The line 106 is thus also referred to as digital subscriber line, or DSL line. At the exchange 104 is also a line optimising unit 114 connected to the DSLAM 110. Connected to the DSLAM 110 is a rate adaptive management module 112, which provides dynamic line management DLM for lines connected to the DSLAM 110. The rate adaptive management module 112 measures the performance of connected lines, and uses DLM to determine the stability of a line and adjust line configuration parameters accordingly. One parameter that can be adjusted is the target signal to noise ratio margin, or target margin. The target margin is taken in account when a line synchronises and affects the stability and synchronisation rate of the line.

The DSLAM is also connected to a line optimising unit 114, which comprises a processor and a data store, such as hard disk array or similar. The line optimising unit 114 gathers various measurements associated with the line from the DSLAM 110 and the CPE 108, stores them in the data store, and the processor uses the stored measurements to determine an optimum point at which to initiate a line synchronisation to improve the synchronisation rate in accordance with an example of the invention. Measurements can be gathered at regular intervals.

The DSLAM 110 also has onward connections 116 to data provisioning networks. A skilled person will also appreciate that there are other elements in the exchange 104, such as elements that provide standard PSTN services to connected lines. However, these have been omitted for simplicity.

The CPE 108 also includes a line optimising unit 118, which is similar to the line optimising unit 114 in the exchange, and also includes a processor and a data store. The line optimising unit 114 gathers various measurements associated with the line 106, stores them in the data store, and the processor uses the stored measurements to determine an optimum point at which to initiate a line synchronisation to improve the synchronisation rate in accordance with an example of the invention.

Whilst the present example shows a DSLAM 110 residing in the exchange 104, the invention would still be applicable to configurations where the DSLAM is located elsewhere. For example, in a fibre to the cabinet (FTTC) arrangement, the DSLAM 110 would be located in a roadside cabinet, which is typically located nearer the customer premises than the exchange.

In an alternative network arrangement, DSLAM like functionality can be provided by an MSAN (multi services access node), which also provides other capabilities such as voice. The DSLAM and MSAN are both examples of aggregation transceiver devices, which effectively aggregate a number of DSL lines, terminating them at a plurality of modems housed within.

An example of the present invention will now be described with reference to the flow chart of FIG. 2.

Processing starts at step 200, where SNR data associated with the line 106 is gathered and continuously stored by the line optimisation unit 118. The SNR is an instantaneous measure of the ratio of the received wanted DSL signal power to unwanted interference signals or noise. The number of bits that can be carried over each frequency bin or tone on a DSL line is dependent on the SNR associated with that tone. The higher the SNR, the more bits can be carried. The SNR referred to here is the absolute SNR and should not be confused with the SNR margin, which is the difference between the absolute SNR and the SNR required to operate the line at a specific synchronisation rate. For example, if the line needs 35 dB of SNR to run at 8 Mbps, and the actual absolute SNR is 41 dB, then the SNR margin would be 6 dB.

The SNR data is obtained from the modem in the CPE, or the DSLAM. As line 106 is a DSL line, Discrete Multitone Modulation (DMT) is used where data is carried over separate frequency bins or tones. Each tone has an associated SNR. The modem in the CPE provides the SNR measurements associated with these tones, measured in decibels, dB, to the line optimisation unit 118. The SNR for a tone is an instantaneous measure that varies over time in dependence on the channel conditions. As such, the SNR measurements are gathered every minute in this example, but may be obtained more or less regularly depending on the configuration of the modem in the CPE.

Whilst there is an associated SNR for both the upstream and the downstream transmission bands on the DSL line, it is usually the downstream band that is considered to be more critical to service quality. As such, reference to SNR and synchronisation rate here will be in relation to the downstream band to optimise the downstream synchronisation rate, though the invention could equally be implemented using the upstream band parameters to optimise the upstream synchronisation rate.

In step 202, the SNR for the line is determined by the line optimisation unit 118 using the SNR data for each tone from step 200. This is done by taking the average SNR over all the tones. The average SNR for the line at a given time is preferably the geometric mean of the SNR of each of the N tones at that time, as set out in the equation (1) below:

$$\overline{SNR} = (\Pi_{i=1}^{N} SNR_i)^{1/N} \quad (1)$$

The approximation of the average SNR to be the geometric mean of the subchannel (or tone) SNRs is discussed in the book, "DSL Advances" by Thomas Starr et al, Chapter 2.5 Discrete Multichannel Transmission.

Whilst the above teaches an approach for determining the average SNR for the line, the average SNR can also be provided directly to the line optimisation module 118 by the modem in the CPE or DSLAM if suitably configured to do so. Alternatively, if neither the average SNR of the line or the SNR data per tone are available, then the average SNR for the line can be derived by the line optimisation module 118 using the SNR margin, where the SNR margin is the difference between the average SNR and the SNR required to operate the line at a specific synchronisation rate.

Figure 3:
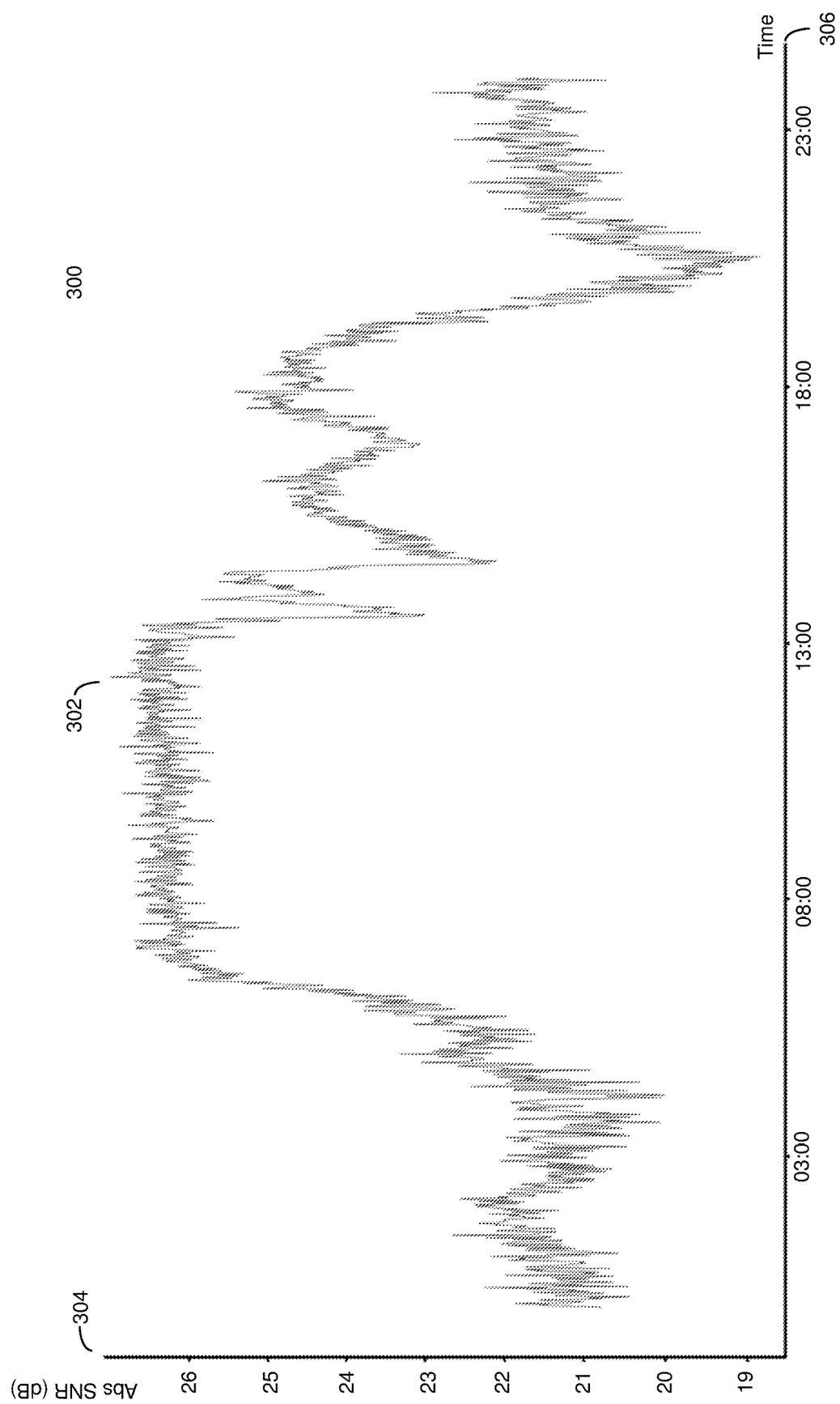
FIG. 3 is a graph illustrating the variation in the SNR for an example line measured over a 24 hour period.

The FIG. 3 is a graph 300 illustrating the SNR 302 for the line over a 24 hour period. SNR is plotted along the y-axis 304 and is measured in dB, and time on the x-axis 306. The SNR shown here is the average SNR for the line as determined in step 202. In a further refinement of the invention, the SNR for the line is determined over a number of 24 periods, and then averaged to generate a daily SNR graph. This is practical as the daily variation in SNR on a line is due in large part to the diurnal effect, which repeats on a daily basis.

The synchronisation rate of this line is dependent on the number of bits allocated per tone. The bit allocation in turn is dependent on the SNR available in each tone at the time the line synchronises. Approximations can be made for the average number of bits that can be allocated per tone using the average SNR instead of the SNRs of each tone. Whether the average SNR for the line is used, or the SNR per tone, the principle remains the same, which is that the higher the SNR, the more bits can be allocated (up to a maximum of 15 bits per tone), and thus the higher the resulting synchronisation rate. Thus, synchronising the line when the SNR is highest will result in the highest synchronisation rate.

However, in practice the SNR of a line does not remain constant over time, as the line will experience varying channel conditions. Thus, if the line allocates bits using all the available SNR, and the SNR then later drops, then the line won't have sufficient SNR to sustain the original synchronisation rate, and the line loses synchronisation. DSL lines are normally set up to automatically attempt to reinitialise and synchronise the line following a loss of synchronisation, resulting in a brief period of loss of service.

To avoid this problem, a target SNR margin is used, which effectively sets a buffer zone for the SNR and is used during bit allocation. The target SNR margin, or target margin, is a parameter that is usually set by DLM, in this case the rate adaptive management module 112. To illustrate its use, taking the example of the SNR measured at 25 dB, if a target margin of 6 dB is set, then in effect, the SNR is reduced by 6 dB to 19 dB for bit allocation purposes. Thus, the SNR after synchronisation can theoretically drop to 19 dB before the line is likely to lose synchronisation.

Referring to the graph 300 of FIG. 3. If a line synchronisation is performed when the SNR is at a minimum over the period, so just after 22:00 when the SNR is around 19 dB, then the resulting synchronisation rate will be lower than if the SNR was higher for the reasons set out above. However, the line is likely to be quite stable as the SNR does not drop to any lower value. Alternatively, if a line synchronisation is performed when the SNR is at a maximum over the period, so almost anytime from 07:00 to 13:00 where the SNR is just over 26 dB, then the resulting synchronisation rate would be higher than if synchronising at a minimum SNR as the SNR available is much greater for bit allocation purposes. However, the line may not be particularly stable, as the SNR may drop subsequently to a level where synchronisation is lost.

The present invention proposes an optimum SNR at which to perform a synchronisation of the line that maximises the resulting synchronisation rate, whilst aiming to maintain stability. The approach utilises the minimum SNR over a period of time, and the target SNR margin.

Thus, in step 204, the line optimisation unit 118 analyses the SNR for the line, and determines the minimum SNR over a period of time. This can be done by analysing the SNR variation over any 24 hour period such as the graph 300 in FIG. 3. Alternatively, another approach is to gather a number of 24 hour periods together, and determine a single SNR plot taken as the average (e.g. using either the geometric or arithmetic mean) of each of the individual 24 hour plots. In this way, minor variations from one 24 hour period to another are averaged out. In a similar manner, the maximum SNR over a period of time is also determined in step 204.

In step 206, the line optimisation unit 118 determines the target margin being used on the line 106. This can be done by directly interrogating the rate adaptive management module 112 that controls DLM, as the target margin is set by DLM. Alternatively, an empirical approach can be used instead.

The target margin can be determined empirically, by examining the SNR margin immediately after a successful resynchronisation. The SNR margin is usually provided by the modem in the CPE as is the current operating SNR margin, and thus can be obtained by the line optimisation unit 118. The target margin can be approximated relatively accurately to the SNR margin immediately after synchronisation. Moreover, as DLM usually sets the target margin in 3 dB increments starting at 3 dB, it is possible to round the measured target margin to one of the possible increments. It should be noted that as DLM changes the target margin applied to the line in a dynamic manner, using the most recent line synchronisation is most reliable.

Now that the line optimisation unit 114 has both the minimum and maximum SNR for the line, and also the target margin, the optimum SNR margin at which to synchronise the line can be calculated.

In step 208, the optimum SNR margin is calculated as the sum of the minimum SNR plus the target margin, as set out in equation (2) below:

$$\text{Optimum SNR} = \text{minimum SNR} + \text{target SNR margin} \quad (2)$$

This optimum SNR is the SNR at which a line synchronisation should be performed in order to maximise the synchronisation rate, whilst avoiding loss of synchronisation as a result of the SNR dropping by an amount greater than the SNR at the time of synchronisation.

In step 210, the line optimisation unit 118 monitors the SNR of the line 106, and triggers synchronisation at a time when the SNR of the line is equal to the optimum SNR, or slightly under the optimum SNR.

In practice, an additional SNR threshold or tolerance is determined by the line optimisation unit 1118, and subtracted from the optimum SNR to account for sensitivities in the modem, and to damp any imprecision in the min SNR calculations. This would depend on the line set-up, but a typical value would be around 3 dB.

This SNR tolerance can further be defined as the SNR margin below which the line loses synchronisation. In practice, this is not at 0 dB, but at some non-zero value that depends on the DSLAM and modem in CPE, their settings, tolerances and so on. However, one method of determining this parameter is described as follows. Specifically, the SNR margin measured by the modem in the CPE is also monitored by the line optimisation unit 118, and the SNR margin just before the line loses synchronisation is determined as the SNR tolerance. However, it is better to look at a number of lost synchronisations, and to take the average of the SNR margin values just prior to synchronisation being lost as the minimum stable SNR margin. As suggested above, a typical value would be around 3 dB. It should be noted that the precise value for the SNR tolerance will depend on the sampling rate of the SNR margin data of the line. Measurements taken more frequently from the line will lead to a more accurate measure of the SNR tolerance.

To illustrate the method of determining of the optimum SNR, reference is made to the example shown by the graph 300. The minimum SNR here is determined as 19 dB (when the time is around 20:00), and assume the target SNR margin is determined as 6 dB. The optimum SNR is then be calculated to be 25 dB (=19 dB+6 dB). The line optimisation unit 118 would then monitor the SNR on the line, and assuming roughly the same SNR pattern is observed as shown in graph 300 each day, then the line optimisation unit 118 would synchronise the line at around 06:00, when the SNR is reaches the optimum SNR of 25 dB.

By applying the additional feature of the SNR tolerance, say 3 dB, the optimum SNR is reduced from the 25 dB to 22 dB, and the line is instead resynchronised in step 210 when the SNR is at 22 dB.

The monitoring and performing a resynchronisation of step 210 can be delayed until the line is inactive, to avoid interrupting the service experienced by the customer. For example, a resynchronisation can be delayed until there has been a predetermined period, say 5 minutes, of inactivity on the line, but with the SNR still being at or just below the optimum SNR. A prediction of when inactivity may be experienced can be done by the line optimisation unit 118 monitoring real time line usage, or using historical line activity or by a combination of both.

Should the calculated optimum SNR result in a value that is greater than the maximum SNR determined in step 204, then the synchronisation at step 210 should be done at the maximum SNR.

In practice, the step of resynchronising in step 210 should not be performed unless it is likely to result in a significant change in synchronisation rate, for example if the last resynchronisation was performed when the SNR was significantly different from the currently determined optimum SNR. This can happen if the last resynchronisation occurred not as a result of a line optimisation unit 118 causing the resynchronisation at an optimum determined SNR, but for some other reason such as a power loss or a forced resynchronisation due to excessive errors causing a resynchronisation at a less than optimal SNR. Alternatively, the determined optimum SNR may have changed significantly from the last resynchronisation, which can be caused by a change in minimum SNR or target SNR margin. Thus, steps 200 to 208 are performed constantly by the line optimisation unit 118, but the final step of resynchronisation is selectively performed only when the new optimum SNR shows a significant (for example a greater than 10%) difference from the measured SNR at the time of the last resynchronisation.

The predetermined time period used in the method above is a 24 hour or daily window. However some other period could be used instead, such as a weekly period. Ultimately, the requirement is that a minimum SNR is determined that can be used to determine the optimum SNR at which to later synchronise the line.

Whilst the above example has been described with reference to the line optimising unit 118 at the customer's premises 102, the same method is equally applicable to the line optimising unit 114 at the exchange 104 instead.

Exemplary embodiments of the invention are realised, at least in part, by executable computer program code which may be embodied in an application program data. When such computer program code is loaded into the memory of the processor in the line optimising unit 118, it provides a computer program code structure which is capable of performing at least part of the methods in accordance with the above described exemplary embodiments of the invention.

Figure 2:
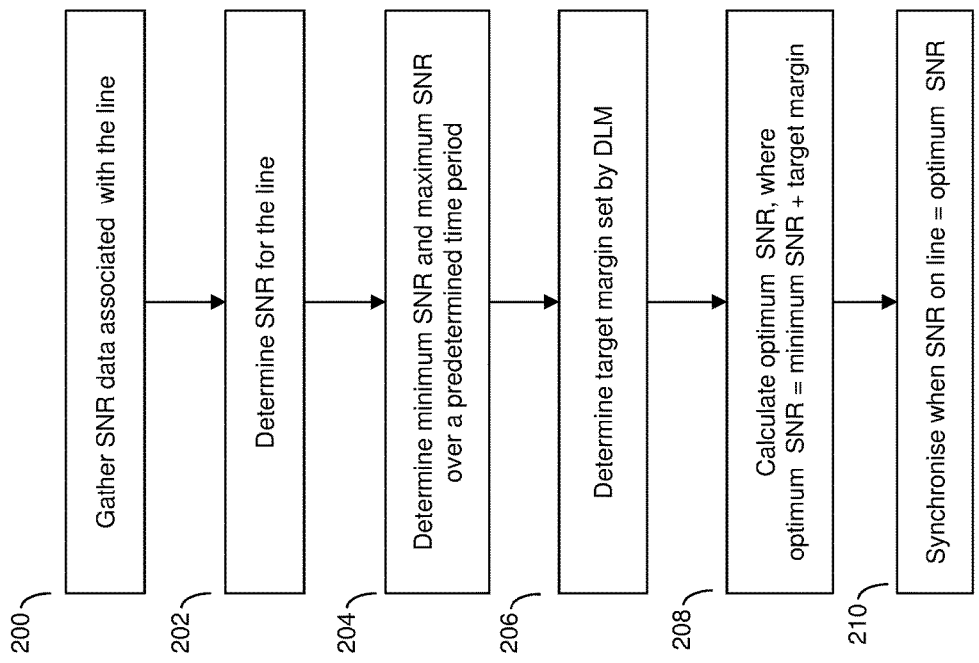
FIG. 2 is a flow chart summarising the steps of an example of the present invention.

A person skilled in the art will appreciate that the computer program structure referred can correspond to the flow chart shown in FIG. 2, where each step of the flow chart can correspond to at least one line of computer program code and that such, in combination with the processor in the line optimising unit 118, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

One possible modification concerns the time at which to cause a resynchronisation. In the main embodiment described above, resynchronisation is triggered at the optimum SNR. In general, this approach works well even though a line may have to wait a considerable period of time before it experiences the optimum SNR at which to perform a resynchronisation, especially if the optimum SNR is close to the maximum experienced SNR which may only occur, for example, once per day. An alternative however would be to allow a resynchronisation to be triggered at a sub-optimal SNR if it is likely to result in an improved connection for a significant period of time (e.g. in excess of 3 hours) before the connection, based on a diurnal variation similar to that shown in FIG. 3 for example, is expected to experience an optimum SNR. For example, with reference to FIG. 3, if an optimum SNR of 26 dB was determined, and a resynchronisation occurred at about 14:00 (when perhaps the prevailing SNR was 22 dB) it may be that the line would ordinarily have to wait until about 07:00 the following day until a suitable optimum SNR was experienced by the line. In such a case, the system could determine that within a specified shorter period of time (of say 3 hours) the "best" SNR that is likely to be experienced might be about 24 dB and so the system could cause a resynchronisation to occur at this determined "local maximum" rather than waiting until the optimum SNR is reached. Such an approach would be useful if the optimum SNR is not expected to be reached until after the specified shorter period of time assuming that a better (but still stable) rate is likely to be reached and enjoyed by the user as a result of such a sub-optimal resynchronisation.

Yet another possible variation is to select as the minimum SNR only the minimum SNR experienced during a time that the user typically uses his or her connection. Thus, for example, if the user, whose line varied daily as per FIG. 3, only ever used the connection between 8:00 and 18:00, the minimum SNR could be chosen from this period, which is at about 14:00 with a minimum SNR of about 22 dB, rather than the minimum SNR experienced over the 24 hour period at about 21:00 of about 19 dB. In such a situation, there is a significant risk that a resynchronisation will occur as a result of the SNR falling below the specified minimum SNR at a time when the user is not using the connection. Moreover, it may be advantageous in such a case to ensure that a resynchronisation occurs at a better SNR (even if at a still somewhat sub-optimal SNR as per the variation described in the paragraph above) prior to the line entering a period where it is expected that the user will start to use the connection again. For example, if the minimum SNR of 22 dB was selected as discussed above, an optimum SNR of 25 dB could result. In such a case a line caused to re-synch at about 6:00 or 7:00 could remain in synchronisation for the whole day until about 19:00 when the SNR drops below 22 dB. At that time, the line will resynchronise forcedly at a lower rate than it was at before and stay at that lower rate until a resynchronisation is triggered at about 6:00 or 7:00 the following day. In the situation where the user is not using his or her line before 8:00 this is not a problem. This approach would generally result in many more resynchronisations occurring (at least 2 more per day in the above example) but this may be acceptable in some situations, and so is a possible variant that may be appropriate in some circumstances.

The invention claimed is:

1. A method of managing a digital subscriber line in a telecommunications network, comprising:
  determining a minimum signal to noise ratio of the digital subscriber line over a predetermined period of time from a plurality of signal to noise ratio values associated with the digital subscriber line;
  determining a target signal to noise ratio margin for the digital subscriber line;
  calculating an optimum signal to noise ratio as the sum of the minimum signal to noise ratio plus the target signal to noise ratio margin; and
  monitoring the digital subscriber line and synchronising the digital subscriber line at a time when the signal to noise ratio of the monitored digital subscriber line equals the optimum signal to noise ratio.

2. A method according to claim 1, wherein determining a target signal to noise ratio margin comprises obtaining said target signal to noise ratio margin from a dynamic line management system.

3. A method according to claim 1, wherein the target signal to noise ratio margin is determined by analysis of the signal to noise ratio margin of the digital subscriber line over a period of time, and identifying the target signal to noise ratio margin as the signal to noise ratio margin of the digital subscriber line after a successful resynchronisation.

4. A method according to claim 1, wherein the predetermined period of time is a day.

5. A method according to claim 1, wherein the sum further includes a predetermined signal to noise ratio tolerance.

6. A line optimisation unit for managing a digital subscriber line in a telecommunications network adapted to:
  determine a minimum signal to noise ratio of the digital subscriber line over a predetermined period of time from a plurality of signal to noise ratio values associated with the digital subscriber line;
  determine a target signal to noise ratio margin for the digital subscriber line;
  calculate an optimum signal to noise ratio as the sum of the minimum signal to noise ratio plus the target signal to noise ratio margin; and
  monitor the digital subscriber line and synchronise the digital subscriber line at a time when the signal to noise ratio of the monitored digital subscriber line equals the optimum signal to noise ratio.

7. A line optimisation unit according to claim 6, wherein the line optimisation unit is adapted to obtain the target signal to noise ratio from a dynamic line management system.

8. A line optimisation unit according to claim 6, wherein the sum further includes a predetermined signal to noise ratio tolerance.

9. A customer premises equipment comprising a line optimisation unit for managing a digital subscriber line in a telecommunications network, said line optimisation unit adapted to:
  determine a minimum signal to noise ratio of the digital subscriber line over a predetermined period of time from a plurality of signal to noise ratio values associated with the digital subscriber line;
  determine a target signal to noise ratio margin for the digital subscriber line;

calculate an optimum signal to noise ratio as the sum of the minimum signal to noise ratio plus the target signal to noise ratio margin; and monitor the digital subscriber line and synchronise the digital subscriber line at a time when the signal to noise ratio of the monitored digital subscriber line equals the optimum signal to noise ratio.

10. An aggregation transceiver device for aggregating a plurality of digital subscriber lines, comprising a line optimisation unit for managing the digital subscriber lines and adapted to:

determine a minimum signal to noise ratio of a digital subscriber line over a predetermined period of time from a plurality of signal to noise ratio values associated with the digital subscriber line;

determine a target signal to noise ratio margin for the digital subscriber line;

calculate an optimum signal to noise ratio as the sum of the minimum signal to noise ratio plus the target signal to noise ratio margin; and monitor the digital subscriber line and synchronise the digital subscriber line at a time when the signal to noise ratio of the monitored digital subscriber line equals the optimum signal to noise ratio.

11. A method of managing a digital subscriber line in a telecommunications network, comprising:

determining a minimum signal to noise ratio of the digital subscriber line over a predetermined period of time from a plurality of signal to noise ratio values associated with the digital subscriber line;

determining a target signal to noise ratio margin for the digital subscriber line;

calculating an optimum signal to noise ratio as the sum of the minimum signal to noise ratio plus the target signal to noise ratio margin; and synchronising the digital subscriber line in dependence on the optimum signal to noise ratio;

wherein the target signal to noise ratio margin is determined by analysis of the signal to noise ratio margin of the digital subscriber line over a period of time, and identifying the target signal to noise ratio margin as the signal to noise ratio margin of the digital subscriber line after a successful resynchronisation.

12. The line optimisation unit according to claim 6, wherein the target signal to noise ratio margin is determined by analysis of the signal to noise ratio margin of the digital subscriber line over a period of time, and identifying the target signal to noise ratio margin as the signal to noise ratio margin of the digital subscriber line after a successful resynchronisation.

13. The customer premises equipment according to claim 9, wherein the target signal to noise ratio margin is determined by analysis of the signal to noise ratio margin of the digital subscriber line over a period of time, and identifying the target signal to noise ratio margin as the signal to noise ratio margin of the digital subscriber line after a successful resynchronisation.

14. The aggregation transceiver device according to claim 10, wherein the target signal to noise ratio margin is determined by analysis of the signal to noise ratio margin of the digital subscriber line over a period of time, and identifying the target signal to noise ratio margin as the signal to noise ratio margin of the digital subscriber line after a successful resynchronisation.

* * * * *